United States Patent [19]
McManus

[11] 3,906,000
[45] Sept. 16, 1975

[54] TRICYCLICAZAINDOLE DERIVATIVES

[75] Inventor: James M. McManus, Old Lyme, Conn.

[73] Assignee: Pfizer Inc., New York, N.Y.

[22] Filed: Mar. 1, 1974

[21] Appl. No.: 447,073

Related U.S. Application Data

[62] Division of Ser. No. 228,743, Feb. 23, 1972, Pat. No. 3,833,591.

[52] U.S. Cl......... 260/326.5 B; 260/326.9; 424/274
[51] Int. Cl.²...................................... C07D 207/12
[58] Field of Search ................... 260/326.5 B, 326.9

[56] References Cited
UNITED STATES PATENTS
3,314,942 4/1967 Hester.............................. 260/239.3

Primary Examiner—Paul M. Coughlan, Jr.
Assistant Examiner—James H. Turnipseed
Attorney, Agent, or Firm—Connolly and Hutz

[57] ABSTRACT

A series of novel tricyclicazaindole compounds have been prepared by condensing the appropriate 4-aminoalkylindole or a corresponding 4-aminoethoxyindole with a suitable aldehyde reagent. The resulting tricyclic derivatives are found to be useful as oral hypoglycemic agents. Preferred member compounds include 1,3,4,5-tetrahydro-3-isopropylpyrrolo[4,3,2-d,e]isoquinoline, 3,4,5,6-tetrahydro-3-isopropyl-8,10-dimethoxy-1H-azacino[3,4,5-c,d]-indole and 3,4,5,6-tetrahydro-3-isopropyl-8-methoxy-1H-1,4-oxazocino[6,7,8-c,d]indole, and their pharmaceutically acceptable acid addition salts.

4 Claims, No Drawings

TRICYCLICAZAINDOLE DERIVATIVES

This application is a division of application Ser. No. 228,743 filed Feb. 23, 1972, and now U.S. Pat. No. 3,833,591.

BACKGROUND OF THE INVENTION

This invention relates to new and useful tricyclicazaindole derivatives, which are effective in reducing blood sugar levels. More particularly, it is concerned with certain novel alkyl and aryl substituted tricyclicazaindoles and their pharmaceutically acceptable acid addition salts, which are useful as oral hypoglycemic agents for lowering the blood sugar levels of diabetic subjects.

In the past, various attempts have been made by numerous investigators in the field of organic medicinal chemistry to obtain new and useful oral hypoglycemic agents. For the most part, these efforts have principally involved the synthesis and testing of various new and heretofore unavailable organic compounds, particularly in the area of the sulfonylureas. However, in the search for still newer and better oral hypoglycemic agents, very little is known about the activity of various ring-nitrogen compounds like the indoles and their derivatives. For instance, certain aminomethylindole compounds are active, while others are not (see U.S. Pat. No. 3,459,767 and 3,542,927). On the other hand, several 5,7-dimethoxytryptamines are very active in this respect (see U.S. Pat. No. 3,564,012), but 5-methoxy and 7-methoxytryptamines are only useful as analeptic agents (British Pat. Nos. 974,894, 974,893 and 974,895).

SUMMARY OF THE INVENTION

In accordance with the present invention, it has now been rather surprisingly found that certain novel tricyclicazaindole derivatives, i.e., non-sulfonylureas, are extremely useful when employed as oral hypoglycemic agents for the treatment of diabetic subjects. The novel compounds of this invention are all selected from the group consisting of tricyclicazaindole bases of the formulae:

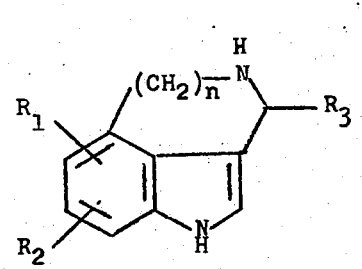

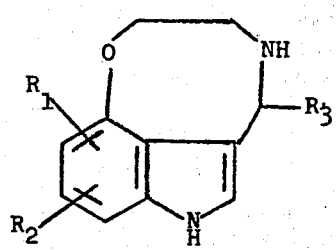

and the pharmaceutically acceptable acid addition salts thereof, wherein $R_1$ and $R_2$ are each a member selected from the group consisting of hydrogen and methoxy, $n$ is an integer of from one to three, inclusive, and $R_3$ is a member selected from the group consisting of alkyl having from one to six carbon atoms, cycloalkyl having from three to six carbon atoms, phenylalkyl having up to three carbon atoms in the alkyl moiety, phenyl, chlorophenyl, tolyl, anisyl and thienyl. These compounds are all useful in lowering blood sugar levels when administered by the oral route of administration.

Of especial interest in this connection are the preferred compounds of the present invention where $R_3$ in the aforesaid structural formulae is alkyl having from one to six carbon atoms (and most preferably, isopropyl), or it is cyclohexyl or phenyl. Typical member compounds of the preferred class include such tricyclicazaindole compounds as 1,3,4,5-tetrahydro-3-isopropylpyrrolo[4,3,2-d,e]isoquinoline, 1,3,4,5-tetrahydro-3-isopropyl-6,8-dimethoxypyrrolo[4,3,2-d,e]isoquinoline, 3,4,5,6-tetrahydro-3-isopropyl-1H-azepino[3,4,5-c,d]indole, 3,4,5,6-tetrahydro-3-isopropyl-8,10-dimethoxy-1H-azacino[3,4,5-c,d]indole and 3,4,5,6-tetrahydro-3-isopropyl-8-methoxy-1H-1,4-oxazocino[6,7,8-c,d]indole, and their pharmaceutically acceptable acid addition salts such as the hydrochlorides and acetates, respectively. These particular compounds are all highly potent as regards theirhhypoglycemic activity.

DETAILED DESCRIPTION OF THE INVENTION

In accordance with the process employed for preparing the novel compounds of this invention, an appropriately substituted 4-aminoalkylindole or a corresponding 4-aminoelhoxyindole is reacted with a suitable aldehyde reagent of the formula $R_3CHO$, where $R_3$ is as previously defined, to form the desired tricyclicazaindole final product of respectively either formula I or II, as the case may be. This particular reaction is normally conducted in a suitable reaction-inert aprotic organic solvent in the presence of an acid at a temperature that is generally in the range of from about 20°C. up to about 80°C. for a period of about one-half to about 20 hours. In practice, it is usually found most convenient to use a slight excess of the aldehyde reagent (say, for example, a 10% molar excess of reagent) and to employ an organic acid as catalyst for the reaction. Preferred aprotic solvents for use in the reaction include cyclic ethers such as dioxane and tetrahydrofuran, aromatic hydrocarbon solvents such as benzene, toluene and xylene, as well as N,N-dialkyl lower alkenoamides like N,N-dimethylformamide, N,N-dimethylacetamide, N,N-diethylformamide and so on, while preferred organic acids include the lower alkanoic acids such as formic acid, acetic acid, propionic acid, and the like, with glacial acetic acid being most preferred. Upon completion of the reaction, the desired product is readily recovered from the spent reaction mixture by using such conventional means as concentration and crystallization, etc., or else by first diluting said mixture with water, followed by basification and subsequent extraction with an organic solvent to yield the corresponding free base compound per se.

The aforementioned 4-aminoalkylindole starting materials, used in the reaction process of this invention for preparing the compounds of formula I, are either known compounds or else they are easily prepared by those skilled in the art from readily available materials in accordance with the standard procedures of organic chemistry for preparing classical amines. For instance, the 4-aminoethylindole compound are either known or else readily prepared in two steps from the corresponding 4-carboxaldehyde, via formation of the intermediate oxime and its subsequent reduction with nascent hydrogen. In the other hand, the 4-aminoethylindoles are obtained by treating said aldehyde with nitromethane in a condensation reaction and reducing the resulting nitroolefin intermediate with lithium aluminum hydride. Lastly, the 4-aminopropylindoles are also obtained from said corresponding aldehyde in a series of synthetic organic steps involving (1) a condensation reaction with diethyl malonate (malonic ester) to yield an unsaturated diester; (2) reduction of said ester via catalytic hydrogenation to give a fully saturated compound that is subsequently hydrolyzed to the corresponding dibasic acid; (3) decarboxylation of said diacid to the corresponding monobasic acid and its subsequent conversion to an amide, and (4) reduction of said amide with lithium aluminum hydride to give the desired amin These two last synthetic steps can be briefly illustrated by the following reaction scheme, where R represents the desired indole ring moiety, viz., $RCHO \rightarrow RCH=C(COOC_2H_5)_2 \rightarrow RCH_2CH_2COOH \rightarrow RCH_2CH_2CONH_2 \rightarrow RCH_2CH_2CH_2NH_2$.

The 4-aminoethoxyindole starting materials, on the other hand, used to prepare the compounds of formula II, are all new per se, but are readily prepared by those skilled in the art starting from easily available reagents and employing the conventional methods of organic chemistry. For instance, the appropriate 4-hydroxyindole compound can be simply converted to the corresponding cyanomethoxy derivative via the use of chloroacetonitrile and thereafter reduced as such to the desired amine by means of treatment with lithium aluminum hydride, as is hereinafter illustrated by the following reaction scheme where R has the same meaning as before, viz., $ROH \rightarrow ROCH_2CN \rightarrow ROCH_2CH_2NH_2$.

The pharmaceutically acceptable acid addition salts of the tricyclicazaindole base compounds of this invention (i.e., the final products of formulas I and II) are prepared by simply treating the aforementioned organic bases with various mineral and organic acids which form non-toxic acid addition salts having pharmacologically acceptable anions, such as the hydrochloride, hydrobromide, hydroiodide, sulfate or bisulfate, phosphate or acid phosphate, acetate, lactate, maleate, fumarate, citrate or acid citrate, tartrate or bitartrate, succinate, gluconate, saccharate, methanesulfonate, ethanesulfonate, benzenesulfonate and p-toluenesulfonate salts. For instance, the salt-formation step may be carried out using a substantially equimolar amount of the chosen acid in an aqueous solvent medium or in a suitable organic solvent such as methanol or ethanol. Upon careful evaporation of the solvent, the solid salt product is readily obtained.

As previously indicated, the tricyclicazaindole compounds of this invention are all readily adapted to therapeutic use as oral hypoglycemic agents, in view of their ability to lower the blood sugar levels of diabetic and non-diabetic subjects to a statistically significant degree. For instance, 1,3,4,5-tetrahydro-3-isopropylpyrrolo[4,3,2-d,e]isoquinoline, a typical and preferred agent of the present invention, has been found to consistently lower blood sugar levels in the normal fasted rat to a statistically significant degree when given by the intraperitoneal route of administration at levels ranging from 10 mg./kg. to 32 mg./kg., respectively, without showing any substantial signs of toxic side effects. The other compounds of this invention also cause similar results. Furthermore, all the herein described compounds of this invention can be administered orally, for the present purposes at hand, without causing any significant untoward pharmacological side effects to occur in the subject to whom they are so administered. In general, these compounds are ordinarily administered at dosage levels ranging from about 0.4 mg. to about 15 mg. per kg. of body weight per day, although variations will necassarily occure depending upon the weight and condition of the subject being treated and the particular type of oral formulation chosen.

In connection with the use of the tricyclicazaindole compounds of this invention for the treatment of diabetic subjects, it is to be noted that they may be administered either alone or in combination with pharmaceutically acceptable carriers and that such administration can be carried out in both single and multiple dosages. More particularly, the novel compounds of the invention can be administered in a wide variety of different dosage forms, i.e., they may be combined with various pharmaceutically-acceptable inert carriers in the form of tablets, capsules, lozenges, troches, hard candies, powders, aqueous suspensions, elixirs, syrups and the like. Such carriers include solid diluents or fillers, sterile aqueous media and various non-toxic organic solvents, etc. Moreover, such oral pharmaceutical compositions can be suitably sweetened and/or flavored by means of various agents of the type commonly employed for just such a purpose. In general, the therapeutically-effective compounds of this invention are present in such dosage forms at concentration levels ranging from about 0.5 to about 90% by weight of the total composition, i.e., in amounts which are sufficient to provide the desired unit dosage.

For purposes of oral administration, tablets containing various excepients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, gelatin and acacia. Additionally, lubricating agents such as magnesium stearate, sodium lauryl sulfate and talc are often very useful for tabletting purposes. Solid compositions of a similar type may also be employed as fillers in soft and hard-filled gelatin capsules; preferred materials in this connection would also include the high molecular weight polyethylene glycols. When aqueous suspensions and/or elixirs are desired for oral administration, the essential active ingredient therein may be combined with various sweetening or flavoring agents, coloring matter or dyes and, if so desired, emulsifying and/or suspending agents as well, together with such diluents as water, ethanol, propylene glycol, glycerin and various like combinations thereof.

The activity of the compounds of the present invention, as hypoglycemic agents, is determined by their ability to lower blood sugar levels in the normal fasted rat when tested therein for such purposes according to the procedure described by W. S. Hoffman, as reported in the *Journal of Biological Chemistry*, Vol. 120, p. 51 (1937). The latter method measures directly the amount of glucose in the blood at any given time and from this, the maximum percent decrease in blood sugar can be readily calculated and reported as hypoglycemic activity per se. In this way, the present tricyclicazaindole compounds are shown to markedly reduce the blood sugar levels of anesthetized rats when administered to them at dose levels as low as 32 mg./kg. (a dose level at which chlorpropamide fails to elicit a strong response).

EXAMPLE I

To a solution consisting of 2.0 g. (0.014 mole) of 4-aminomethylindole [M. Holbel and V. Liede, *Chemische Berichte*, Vol. 96, p. 1618 (1963)]Ddissolved in 15 ml. of glacial acetic acid, there were added 1.1 g. (0.0154 mole) of isobutyraldehyde in 42 ml. of benzene. The resulting mixture was then heated in an oil bath at 70° C. for a period of 1.5 hours, cooled and subsequently treated with 200 ml. of ice and water. The aqueous layer was separated and made basic with 20% aqueous sodium hydroxide, followed by extraction of same with diethyl ether. The separated ether layer was then dried over anhydrous magnesium sulfate, filtered and the dried ethereal filtrate was subsequently concentrated in vacuo to near dryness to afford 1.3 g. of 1,3,4,5-tetrahydro-3-isopropylpyrrolo[4,3,2-d,e]isoquinoline, m.p. 177°–179° C. After recrystallization from isopropyl ether, the analytical sample melted at 179°–181° C.

Anal. Calcd. for $C_{13}H_{16}N_2$: C, 77.96; H, 8.05; N, 13.99. Found: C, 77.86; H, 8.04; N, 13.80.

EXAMPLE II

The procedure described in Example I was repeated to prepare the following 3-substituted 1,3,4,5-tetrahydropyrrolo[4,3,2-d,e]-isoquinoline compounds, starting from 4-aminomethylindole and the appropriate aldehyde ($R_3CHO$) reagent in each case:

1,3,4,5-tetrahydro-3-cyclohexylpyrrolo[4,3,2-d,e]isoquinoline, m.p. 182°–183°C.
1,3,4,5-tetrahydro-3-phenylpyrrolo[4,3,2-d,e]isoquinoline, m.p. 208°–210°C.
1,3,4,5-tetrahydro-3-(sec.-butyl)pyrrolo[4,3,2-d,e]isoquinoline, m.p. 106°–108°C.
1,3,4,5-tetrahydro-3-cyclopropylpyrrolo[4,3,2-d,e]isoquinoline, m.p. 208°–209°C.

EXAMPLE III

To a solution consisting of 66.0 g. (0.37 mole) of 5,7-dimethoxyindole [R. Crohare et al., *Journal of Heterocyclic Chemistry*, Vol. 7, p. 729 (1970)] dissolved in 350 ml. of dimethylformamide that was subsequently cooled to 20°C., there were added 59.6 g. (0.37 mole) of phosphorus oxychloride in 400 ml. of the same said solvent over a period of 20 minutes, while maintaining the temperature of the reaction mixture at 22°–28°C. throughout the course of the addition. The resulting mixture was than allowed to stir at room temperature (~25°C.) for a period of one-half hour, followed by the addition of same to a mixture consisting of 6.5 liters of ice and water which also contained 148 ml. of 20% aqueous sodium hydroxide. After stirring for an addition period of 15 minutes, the basified aqueous mixture was filtered and the product collected on the filter funnel to give 23.5 g. of 5,7-dimethoxy-4-indolecarboxyaldahyde, m.p. 164°–170°C. The latter crystalline material had first been washed with water on the filter funnel and then air dried to constant Weight. Upon recrystallization from benzene, the analytical sample melted at 174°–176°C. and possessed the following absorption characteristics in the ultaviolet region of the spectrum, viz., $\lambda_{max}^{MeOH}$ at 255 and 345 $\mu$ (where e=10,781 and 14,750, respectively), with a shoulder at 241 $\mu$ (e=10.781).

Anal. Calcd. for $C_{11}H_{11}NO_3$: C, 64.39; H, 5.40; N, 6.82. Found: C, 64.68; H, 4.98; N, 6.76.

A solution containing 1.02 g. (0.005 mole) of 5,7-dimethoxy-4-indolecarboxaldehyde and 520 mg. (0.007 mole) of hydroxylamine hydrochloride in 10 ml. of pyridine was allowed to stand at room temperature (~25°C.) for a period of 17 hours. The resulting reaction mixture was then poured into 8 ml. of water, and the precipitated solid product thus obtained was susequently collected by means of suction filtration and air dried to constant weight to afford 1.05 g. of 5,7-dimethoxy-4-indolecarboxaldehyde oxime, m.p. 200°–204°C. After recrystallization from ethyl acetate, the analytical sample melted at 206°–208°C.

Anal. Calcd. for $C_{11}H_{12}N_2O_3$: C, 59.99; H, 5.49; N, 12.72. Found: C, 60.01; H, 5.33; N, 12.48.

To a stirred suspension of 4.45 g. (0.02 mole) of 5,7-dimethoxyindolecarboxaldehyde oxime in 300 ml. of ethanol, there were added 29 g. of sodium pellets whileethe entire system was placed under a nitrogen atmosphere. The addition was carried out at such a rate that the ethanol solvent system was maintained at the reflux point throughout, although some external heat was necessary during the last stages of the addition step in order to completely effect the reaction.

The resulting mixture was then cautiously diluted with 300 ml. of water, and the ethanol was subsequently removed by means of evaporation under reduced pressure to afford 3.65 g. of 4-aminomethyl-5,7-dimethoxyindole (m.p. 160°–167°C.) in the form of a solid precipitate (initially isolated by means of suction filtration and then air dried to constant weight). Recrystallization of the analytical sample first from toluene and then from diethyl ether finally raised the melting point to 170°–173°C.

Anal. Calcd. for $C_{11}H_{14}N_2O_2$: C, 64.06; H, 6.84; N, 13.59. Found: C, 64.12; H, 7.05; N, 13.18.

To a suspension of 2.6 g. (0.012 mole) of 4-aminomethyl-5,7-dimethoxyindole in 28 ml. of benzene containing 1.04 g. (0.014 mole) of isobutyraldehyde, there were added 1.2 ml. of glacial acetic acid. The resulting mixture was then heated to reflux for a period of 2 hours, followed by cooling in an ice bath. The precipitate thus obtained was recovered by means of suction filtration and triturated in isopropanol to afford 940 mg. of product as the acetic acid addition salt, melting at 199°–202°C. The free base compound was thereafter liberated from the latter acid addition salt, by adding same to assolution of 20% aqueous sodium hydroxide, followed by extraction with diethyl ether. Upon drying the ether layer in the usual manner (over anhydrous magnesium sulfate) and subsequently concentrating the resulting filtrate in vacuo, there was obtained pure 1,3,4,5-tetrahydro-3-isopropyl-6,8-dimethoxypyrrolo[4,3,2-d,e]isoquinoline as the residual base. After recrystallization from benzene, the analytical sample melted at 191°–194°C.

Anal. Calcd. for $C_{15}H_{20}N_2O_2$: C, 69.20; H, 7.74; N, 10.76. Found: C, 69.44; H, 7.66; N, 10.70.

EXAMPLE IV

To 250 ml. of chilled ethanol at −10°C. containing 15.5 g. (0.107 mole) of 4-indolecarboxaldehyde [E. Hardegger and H. Corrodi, *Helvetica Chimica Acta*, Vol 37, p. 1826 (1954)] and 16.3 g. (0.267 mole) of nitromethane, there were added 15 g. (0.267 mole) of potassium hydroxide in 65 ml. of water and 130 ml. of ethanol. The resulting solution was then stirred at 0°C. for a period of 1.5 hours, and thereafter poured into 3 liters of ice and water, followed by acidification with 6N hydrochloric acid. The precipitate which formed at this point was subsequently collected by means of suction filtration and immediately added to 100 ml. of acetic anhydride containing 15 g. of sodium acetate. The resulting reaction mixture was then refluxed for a period of 10 minutes, followed by removal of the anhydride under reduced pressure. The residue thus obtained was thereafter treated with 200 ml. of water and subsequently made basic by the addition of sodium acarbonate to afford a gum. Extraction of the latter material with diethyl ether, followed by drying of the extract and concentration to an oil in the usual manner then gave 5.2 g. of 4-(2'-nitrovinyl)indole, which was immediately used in the next step without any further purification being necessary.

A solution of 6.3 g. (0.166 mole) of 4-(2'-nitrovinyl)indole in 100 ml. of tetrahydrofuran was prepared and added dropwise to a slurry of 5.2 g. (0.0276 mole) of lithium aluminum hydride in 100 ml. of the same said solvent. The addition step was carried out while the entire system was placed under a nitrogen atmosphere. Upon completion of this step, the reaction mixture was allowed to stir for an additional period of 15 minutes, followed by the addition of 600 ml. of water and 50 ml. of 20% aqueous sodium hydroxide to the mixture in order to carefully decompose excess hydride reagent. The treated aqueous mixture so obtained was then thoroughly extracted with diethyl ether, and the separated ether layers subsequently combined and dried over anhydrous sodium sulfate. After removal of the drying agent by means of filtration and the solvent by means of evaporation under reduced pressure, there were obtained 2.2 g. of 4-(2'-aminoethyl)indole in the form of a partially solid residue. A portion of the latter material was then converted to the corresponding picrate salt for analytical purposes and recrystallized as such from ethyl acetate-methanol to constant melting point. The analytical sample melted at 243.5°C. (dec.).

Anal. Calcd. for $C_{10}H_{12}N_2 \cdot C_6H_3N_3O_7$: C, 49.36; H, 3.88; N, 17.99. Found: C, 49.36; H, 3.90; N, 18.12.

To a solution consisting of 1.2 g. (0.00749 mole) of 4-(2'-aminoethyl)indole dissolved in 15 ml. of glacial acetic acid, there was added 595 mg. (0.00824 mole) of isobutyraldehye in 25 ml. of benzene. The resulting reaction mixture was then heated to 50°–55°C. for a period of 20 minutes, cooled and subsequently poured into 150 ml. of ice and water. The aqueous layer was separated and made basic with 20% aqueous sodium hydroxide, followed by extraction of same with diethyl ether. The separated ether layer was then dried over anhydrous sodium sulfate, filtered and the dried ethereal filtrate subsequently concentrated in vacuo to afford 590 mg. of 3,4,5,6-tetrahydro-3-isopropyl-1H-azepino-[3,4,5-c,d]indole (m.p. 171°–175°C.) as the residual product. After recrystallization from toluene, the analytical sample melted at 173.5°–175°C.

Anal. Calcd. for $C_{14}H_{18}N_2$: C, 78.46; H, 8.46; N, 13.08. Found: C, 78.72; H, 8.29; N, 12.72.

EXAMPLE V

A mixture consisting of 4.9 g. (0.024 mole) of 5,7-dimethoxy-4-indolecarboxaldehyde and 1.8 g. (0.024 mole) of ammonium acetate in 20 ml. of nitromethane was heated on a steam bath for a period of 20 minutes. The reaction mixture was then cooled in an ice bath, and the precipitate which formed at this point was subsequently collected by means of suction filtration. The latter crude product was slurried in water, filtered again and then air dried to constant weight to afford 3.26 g. of pure 4-(2'-nitrovinyl)-5,7-dimethoxyindole, m.p. 159°–162°C. After recrystallization from benzene, the analytical sample melted at 167°–169°C.

Anal. Calcd. for $C_{12}H_{12}N_2O_4$: C, 58.06; H, 4.87; N, 11.29. Found: C, 58.23; H, 5.00; N, 11.11.

A solution of 4.2 g. (0.017 mole) of 4-(2'-nitrovinyl)-5,7-dimethoxyindole in 85 ml. of dry tetrahydrofuran was prepared and added dropwise to a slurry of 3.8 g. (0.102 mole) of lithium aluminum hydride in 70 ml. of the same said solvent, while the entire system was under a nitrogen atmosphere. The addition was complete in about one-half hour. The spent reaction mixture was then cooled to room temperature and the excess hydride reagent reagent carefully decomposed by the slow addition thereto of 35 ml. of 50% tetrahydrofuran-water (1:1 by volume). The solids which formed at this point were then removed by means of filtration, and the resulting filtrate was thereafter concentrated in vacuo to provide 3.4 g. of 4-(2'-aminoethyl)-5,7-dimethoxyindole as the residual product in the form of a crude oil. A portion of the latter material was then converted to the corresponding picrate salt for analytical purposes and recrystallized as such from isopropanol to give pure compound. The analytical sample melted at 217°–220°C.

Anal. Calcd. for $C_{12}H_{16}N_2O_2 \cdot C_6H_3O_7$: C, 48.11; H, 4.26; N, 15.88. Found: C, 48.50; H, 4.28; N, 15.17.

To a stirred suspension of 1.1 g. (0.00499 mole) of 4-(2'-aminoethyl)-5,7-dimethoxyindole in 10 ml. of benzene containing 2.0 ml. of glacial acetic acid, there was added 395 mg. (0.0054 mole) of isobutyraldehyde dissolved in 10 ml. of benzene. The addition step was carried out with the aid of some cooling. Upon completion of same, the reaction mixture was allowed to stir at room temperature for a period of 1 hour, followed by heating at 50°–55°C. for the same period of time. The resulting mixture was then cooled, and the precipitated solid filtered and air dried to constant weight to give 1.0 g. of 3,4,5,6-tetrahydro-3-isopropyl-7,9-dimethoxy-1H-azepino[3,4,5-c,d]indole as the acetate salt, m.p. 189°C. (dec.). After recrystallization from acetonitrile, the analytical sample melted at 192°C. (dec.).

Anal. Calcd. for $C_{16}H_{22}N_2O_2 \cdot C_2H_4O_2$: C, 64.64; H, 7.84; N, 8.38. Found: C, 64.73; H, 7.82; N, 8.26.

EXAMPLE VI

In a flask fitted with a Dean-Stark trap, there was placed a mixture consisting of 20 g. (0.097 mole) of 5,7-dimethoxyindole-3-carboxaldehyde, 16.8 g. (0.104 mole) of diethylmalonate, 2.0 ml. of pyridine, 2.8 ml. of glacial acetic acid and 960 ml. of benzene. The mixture was heated to reflux for a period of 36 hours, during which time water was collected in the manner indicated above. The benzene solvent was then removed by means of evaporation under reduced pressure, and the residual material obtained as product was thereafter triturated with 400 ml. of isopropyl ether to afford 29.2 g. of ethyl α-carbethoxy-5,7-dimethoxyindole-4-acrylate, m.p. 105°–107°C. After recrystallization from ethanol-water, the analytical sample melted at 111°–114°C.

Anal. Calcd. for $C_{18}H_{21}NO_6$: C, 62.23; H, 6.09; N, 4.03. Found: C, 62.38; H, 6.25; N, 4.18.

A mixture of 1.7 g. (0.0049 mole) of ethyl α-carbethoxy-5,7-dimethoxyindole-4-acrylate and 350 mg. of platinum oxide in 50 ml. of ethanol was shaken in a hydrogen atmosphere at room temperature (~25°C.) and at an initial pressure of 45 p.s.i.g. of hydrogen. After 5 hours, the theoretical amount of hydrogen uptake could be observed. The spent catalyst was then removed from the mixture by means of suction filtration, and the resulting filtrate thereafter concentrated in vacuo to afford 1.7 g. of diethyl 5,7-dimethoxy-4-indolylmethylmalonate in the form of a brown solid residue, m.p. 98°–102°C. After recrystallization from isopropyl ether, the analytical sample melted at 104°–105°C.

Anal. Calcd. for $C_{18}H_{23}NO_6$: C, 61.87; H, 6.64; N, 4.01. Found: C, 61.89; H, 6.67; N, 4.03.

A suspension of 5.6 g. (0.016 mole) of diethyl 5,7-dimethoxy-4-indolylmethylmalonate in 34 ml. of 15% aqueous potassium hydroxide was heated to reflux for a period of 1 hour. The clear yellow solution which resulted was then cooled in an ice bath and slowly acidified with 6N hydrochloric acid to give a crystalline precipitate. The latter material was subsequently recovered by means of suction filtration and air-dried to constant weight to give a 4.4 g. yield of 5,7-dimethoxy-4-indolylmethylmalonic acid, m.p. 141°–142°C. After recrystallization from ethyl acetate-pentane, the analytical sample melted at 150°–151°C.

Anal. Calcd. for $C_{14}H_{15}NO_6$: C, 57.33; H, 5.61; N, 4.78. Found: C, 57.14; H, 5.28; N, 4.56.

5,7-Dimethoxy-4-indolylmethylmalonic acid (5.5 g., 0.018 mole) was pyrolyzed by a heating bath temperature of 200°C. for a period of 10 minutes, while under a reduced pressure of 1.0 mm. Hg. During this time, the solid starting material was observed to melt with a vigorous evolution of gas. Upon completion of this step, the reaction mixture was cooled to room temperature, and the residue subsequently dissolved in 25 ml. of 10% (w./v.) aqueous sodium hydroxide to give a clear solution immediately after being filtered. The cooled filtrate was then carefully acidified with concentrated hydrochloric acid, and the resulting precipitate subsequently collected by means of suction filtration and air-dried to constant weight to give 3.6 g. of β-(5,7-dimethoxy-4-indole)propionic acid, m.p. 136°–139°C. Recrystallization of the latter material from isopropyl either then raised the melting point of the final product to 142°–144°C.

Anal. Calcd. for $C_{13}H_{15}NO_4$: C, 62.64; H, 6.07; N, 5.62. Found: C, 62.94; H, 6.22; N, 5.39.

To a chilled solution consisting of 5.0 g. (0.02 mole) of β-(5,7-dimethoxy-4-indole)propionic acid dissolved in 100 ml. of chloroform at 0°C., there were added 2.2 g. (0.022 mole) of triethylamine, followed by 2.4 g. (0.022 mole) of ethyl chloroformate. After allowing the reaction mixture to stir at 20°C. for 10 minutes, 80 ml. of dimethoxyethane that had previously been saturated with dry ammonia gas was then added dropwise to the mixture, with continued stirring being maintained throughout the course of the addition step. Upon completion of this step, the resulting mixture was stirred in the cold for a period of one hour and then allowed to attain room temperature prior to being concentrated in vacuo. The residual solids obtained in this manner were then subsequently triturated with 80 ml. of water, and the treated product was filtered and air dried to constant weight to give 4.6 of β-(5,7-dimethoxy-4-indole)propionamide, m.p. 613°–165°C. After recrystallization from toluene, the analytical sample melted at 165°–166°C.

Anal. Calcd. for $C_{13}H_{16}N_2O$; C, 62.88; H, 6.50; N, 11.29. Found: C, 62.75; H, 6.59; N, 11.06.

A solution of 4.0 g. (0.016 mole) of 62 -(5,7-dimethoxy-4-indole)propionamide in 175 ml. of tetrahydrofuran, was added dropwise, while under a constant nitrogen atmosphere, to a well-stirred slurry consisting of 2.3 g. (0.6 mole) of lithium aluminum hydride in 100 ml. of the same said solvent. The addition step was carried out during the course of a 15-minute period with agitation of the mixture being maintained continuously throughout. Upon completion of this step, the reaction mixture was stirred at room temperature (~≅°C.) for a period of 1 hour, followed by a period of reflux for 1.5 hours. Water was then carefully added to the cooled mixture to decompose excess hydride, and the resulting salts were thereafter removed by means of filtration to give a clear aqueous filtrate that was subsequently concentrated in vacuo. In this manner, there was obtained a 3.4 g. yield of 4-(3-aminopropyl)-5,7-dimethoxyindole as a yellow solid melting at 78°–83°C. After recrystallization from isopropyl ether, the pure product melted at 92°–94°C.

Anal. Calcd. for $C_{13}H_{18}N_2O_2$: C, 66.64; H, 7.74; N, 11.96. Found: C, 66.89; H, 7.68; N, 11.72.

A mixture consisting of 2.4 g. (0.01 mole) of 4-(3-aminopropyl)-5,7-dimethoxyindole and 790 mg. (0.011 mole) of isobutyraldehyde in 25 ml. of benzene was allowed to stir at room temperature for a period of 1 hours. The resulting solution was then treated with 2.6 ml. of glacial acetic acid and the reaction mixture was allowed to stir overnight (~16 hours) at ambient temperatures. Upon completion of this step the resulting mixture was refluxed for a period of 1 hour, then cooled and thereafter treated with 300 ml. of diethyl ether to afford a crystalline precipitate. The latter material was subsequently recovered by means of suction filtration and air dried to constant weight to give 1.8 g. of 3,4,5,6-tetrahydro-3-isopropyl-8,10-dimethoxy-1H-azacino[3,4,5-c,d]indole as the acetate salt, m.p. 168°–169°C. After recrystallization from isopropyl ether, the pure product melted at 176°–177°C.

Anal. Calcd. for $C_{19}H_{28}N_2O_2 \cdot C_3H_4O_2$: C, 65.49; H, 8.10; N, 8.04. Found: C, 65.42; H, 7.95; N, 7.69.

EXAMPLE VII

A mixture of 5.3 g. (0.02 mole) of 4-benzyloxy-5-methoxy-indole [M. Julia et al., *Bulletin de al societe chimique de France*, p. 1417 (1965)] and 2.0 g. of 5% palladium-on-carbon catalyst in 50 ml. of ethanol was shaken in a hydrogen atmosphere at room temperature (~25°C.) and 50 p.s.i.g. of hydrogen (initial pressure) for a period of 10 minutes. Upon completion of this step, the catalyst was removed from the mixture by means of filtration and washed on the filter funnel with some ethanol. The aforesaid washings and filtrate were then combined and subsequently concentrated in vacuo to afford 3.0 g. of 4-hydroxy-5-methoxyindole as a crude residual product, m.p. 148°–152°C. After recrystallization from diethyl ether-pentane, the analytical sample melted at 153°–154°C.

Anal. Calcd. for $C_9H_9NO_2$: C, 66.24; H, 5.56; N, 8.59. Found: C, 66.34; H, 5.60; N, 8.62.

To a well-stirred suspension of 480 mg. of sodium hydrosulfite in 48 ml. of dimethylformamide, there were added 8.0 g. (0.049 mole) of 4-hydroxy-5-methoxyindole, followed successively by 2.56 g. (0.053 mole) of 50% sodium hydride and 7.36 g. (0.098 mole) of chloroacetonitrile. The resulting mixture was then allowed to stir at room temperature for a period of 1 hour prior to being treated with 400 ml. of water. The aqueous mixture so obtained was then carefully extracted with two-250 ml. portions of diethyl ether, and the resulting ether extracts were combined and subsequently concentrated in vacuo to afford an impure residual oil as product. The latter material was then washed free of excess hydride oil with benzene-hexane to give 5.6 g. of 4-cyanomethoxy-5-methoxyindole, which was immediately used in the next reaction step without any further purification being necessary.

A solution consisting of 5.0 g. (0.028 mole) of 4-cyanomethoxy-5-methoxyindole in 48 ml. of tetrahydrofuran as prepared and added dropwise during the course of a 30-minute period to a well-stirred slurry of 2.0 g. (0.056 mole) of lithium aluminum hydride in 40 ml. of the same said solvent, while under a dry nitrogen atmosphere at −10°C. The reaction mixture was then allowed to warm to room temperature and thereafter was stirred at that point for a period of 1 hour. Upon completion of this step, the excess hydride reagent was carefully decomposed by the dropwise addition of 2.0 ml. of water in 10 ml. of tetrahydrofuran to the mixture, followed by the subsequent addition of 50 ml. of diethyl ether. The resulting solids obtained in this manner were then removed by means of suction filtration and the filtrate thereafter concentrated in vacuo to give 5.0 g. of 4-(2′-aminoethoxy)-5-methoxyindole in the form of a dark oil. A portion of the latter material was then made to crystallize and after a recrystallization from isopropyl ether, the product melted at 77°–78°C.

Anal. Calcd. for $C_{11}H_{14}N_2O_2$: C, 64.06; H, 6.84; N, 13.59. Found: C, 63.72; H, 6.65; N, 13.17.

A solution consisting of 2.0 g. (0.01 mole) of 4-2′-aminoethoxy)-5-methoxyindole and 860 mg. (0.012 mole) of isobutyraldehyde in 50 ml. of benzene containing 3.0 ml. of glacial acetic acid was heated to 50°C. for a period of 1.5 hours. Upon completion of this step, the resulting mixture was cooled and then concentrated in vacuo to remove the solvent, and the residue was thereafter triturated with diethyl ether to yield 2.3 g. of 3,4,5,6-tetrahydro-3-isopropyl-8-methoxy-1H-1,4-oxazocino[6,7,8-c,d]indole as the acetate salt, m.p. 170°–171°C. Recrystallization of a portion of the latter material from ethyl acetate then gave the analytical sample (m.p. 179°–180°C.).

Anal. Calcd. for $C_{15}H_{20}N_2O_2 \cdot C_2H_4O_2$: C, 63.73; H, 7.55; N, 8.75. Found: C, 64.05; H, 7.60; N, 8.49.

EXAMPLE VIII

Ten parts of weight of 3,4,5,6-tetrahydro-3-isopropyl-8-methoxy-1H-1,4-oxazocino[6,7,8-c,d]indole acetate in 50 parts by volume of water is neutralized with 10N aqueous sodium hydroxide solution. Extraction of the resulting aqueous solution with several portions of methylene chloride, followed by separation of the organic layer and its subsequent concentration under reduced pressure then affords 3,4,5,6-tetrahydro-3-isoprpyl-8-methoxy-1H-1,4-oxazocino[6,7,8-c,d]indole as the free organic base compound.

In like manner, when any of the other tricyclicazaindole salts of this invention, like 3,4,5,6-tetrahydro-3-isopropyl-8,10-dimethoxy-1H-azacino[3,4,5-c,d]indole acetate reported in Example VI, are each individually subjected to this very same reaction procedure, the corresponding free organic base compound is always the final product obtained.

EXAMPLE IX

The following tricyclicazaindole compounds are prepared by employing the appropriate procedures described in the preceding examples, starting from readily available materials in each instance and using the proper aldehyde ($R_3$CHO) reagent of choice for the final condensation step:

| $R_1$ | $R_2$ | n | $R_3$ |
|---|---|---|---|
| H | H | one | $CH_3$ |
| H | 9—$OCH_3$ | two | n—$C_6H_{13}$ |
| 8—$OCH_3$ | H | three | cyclo—$C_3H_5$ |
| 7—$OCH_3$ | 9—$OCH_3$ | two | cyclo—$C_6H_{11}$ |
| H | H | two | $C_6H_5CH_2$ |
| 6—$OCH_3$ | 8—$OCH_3$ | one | $C_6H_5(CH_2)_2$ |
| H | 10—$OCH_3$ | three | $C_6H_5(CH_2)_3$ |
| 7—$OCH_3$ | H | two | $C_6H_5$ |
| 7—$OCH_3$ | 9—$OCH_3$ | two | o—$ClC_6H_4$ |

| $R_1$ | $R_2$ | n | $R_3$ |
|---|---|---|---|
| H | H | three | m—$CH_3C_6H_4$ |
| H | 9—$OCH_3$ | one | p—$CH_3OC_6H_4$ |
| H | H | one | 2-thienyl |
| 7—$CH_3O$ | H | two | 3-thienyl |
| 8—$OCH_3$ | 10—$OCH_3$ | three | 2-thienyl |
| H | H | one | n—$C_6H_{13}$ |
| 6—$OCH_3$ | 8—$OCH_3$ | one | n—$C_6H_{13}$ |
| H | H | two | $CH_3$ |
| H | H | two | n—$C_6H_{13}$ |
| 7—$OCH_3$ | 9—$OCH_3$ | two | $CH_3$ |
| 7—$OCH_3$ | 9—$OCH_3$ | two | n—$C_6H_{13}$ |
| 8—$OCH_3$ | 10—$OCH_3$ | three | $CH_3$ |
| 8—$OCH_3$ | 10—$OCH_3$ | three | n—$C_6H_{13}$ |

EXAMPLE X

The following 3,4,5,6-tetrahydro-1H-1,4-oxazocino[6,7,8-c,d]-indoles are prepared by employing the procedures of Examples VII–VIII, starting from the corresponding 4-hydroxyindole compound and using the appropriate aldehyde ($R_3CHO$) reagent of choice as hereinbefore described:

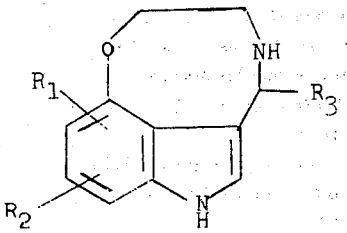

| $R_1$ | $R_2$ | $R_3$ |
|---|---|---|
| H | H | $CH_3$ |
| H | 10–$OCH_3$ | n-$C_6H_{13}$ |
| 8–$OCH_3$ | H | cyclo-$C_3H_5$ |
| 8–$OCH_3$ | 10–$OCH_3$ | cyclo-$C_6H_{11}$ |
| H | H | $C_6H_5CH_2$ |
| 8–$OCH_3$ | H | $C_6H_5(CH_2)_2$ |
| H | 10–$OCH_3$ | $C_6H_5(CH_2)_3$ |
| 8–$OCH_3$ | H | $C_6H_5$ |
| 8–$OCH_3$ | 10–$OCH_3$ | p-$ClC_6H_4$ |
| H | H | o-$CH_3OC_6H_4$ |
| H | 10–$OCH_3$ | m-$CH_3OC_6H_4$ |
| H | H | 2-thienyl |
| 8–$OCH_3$ | H | 3-thienyl |
| 8–$OCH_3$ | 10–$OCH_3$ | 2-thienyl |
| H | H | n-$C_6H_{13}$ |
| 8–$OCH_3$ | H | n-$C_6H_{13}$ |
| 8–$OCH_3$ | H | $CH_3$ |
| 8–$OCH_3$ | 10–$OCH_3$ | n-$C_6H_{13}$ |

EXAMPLE XI

The non-toxic hydrohalide acid addition salts of each of the tricyclicazaindole base compounds of this invention reported previously, such as the corresponding hydrochloride, hydrobromide and hydriodide salts, are each individually prepared by first dissolving the respective organic base compound in absolute ether and then adding a saturated solution of the appropriate hydrohalide gas in ethyl acetate to the aforementioned ethereal solution, whereupon the desired acid addition salt soon precipitates therefrom. In this way, 5.0 g. of 1,3,4,5-tetrahydro-3-isopropylpyrrolo[4,3,2-d,e]isoquinoline, obtained as a free base product in Example I, is converted via dry hydrogen chloride gas to the corresponding hydrochloride acid addition salt in almost quantitative yield.

EXAMPLE XII

The nitrate, sulfate or bisulfate, phosphate or acid phosphate, acetate, lactate, maleate, fumarate, citrate or acid citrate or bitartrate, succinate, gluconate, saccharate, methanesulfonte, ethanesulfonate, benzenesulfonate and p-toluene-sulfonate salts of each of the aforementioned tricyclicazaindole base compounds reported previously are each prepared by dissolving the proper molar amounts of the respective acid and base in separate portions of ethanol and then mixing the two solutions together, followed by the addition of diethyl ether to the resultant mixture in order to effect precipitation of the desired acid addition therefrom. In this manner, equimolar amounts of 3,4,5,6-tetrahydro-3-isopropyl-1H-azepino[3,4,5-c,d]indole and concentrated sulfuric acid react to afford the corresponding sulfuric acid addition salt. In like manner, each of the other salts is also similarly prepared.

EXAMPLE XIII

A dry solid pharmaceutical composition is prepared by blending the following materials together in the proportions by weight specified below:

| | |
|---|---|
| 1,3,4,5-Tetrahydro-3-isopropylpyrrolo[4,3,2-d,e]isoquinoline hydrochloride | 50 |
| Sodium citrate | 25 |
| Alginic acid | 10 |
| Polyvinylpyrrolidone | 10 |
| Magnesium stearate | 5 |

After the dried composition is thoroughly blended, tablets are punched from the resulting mixture, each tablet being of such size that it contains 100 mg. of the active ingredient. Other tablets are also prepared in a similar fashion containing 5, 10, 25 and 50 mg. of the active ingredient, respectively, by merely using the appropriate amount of the tricyclicazaindole salt in each case.

EXAMPLE XIV

A dry solid pharmaceutical composition is prepared by combining the following materials together in the proportions by weight indicated below:

| | |
|---|---|
| 3,4,5,6-Tetrahydro-3-isopropyl-8,10-dimethoxy-1H-axacino[3,4,5-c,d]indole acetate | 50 |
| Calcium carbonate | 20 |
| Polyethylene glycol, average molecular weight, 4000 | 30 |

The dried solid mixture so prepared is then thoroughly agitated so as to obtain a powder product that is completely uniform in every respect. Soft elastic and hard-filled gelatin capsule containing this pharmaceutical composition are then prepared, employing a sufficient quantity of material in each instance so as to provide each capsule with 250 mg. of the active ingredient.

EXAMPLE XV

The tricyclicazaindole final products of Examples I, III–IV and VI–VIII were tested for hypoglycemic activity in groups of 8–10 male albino rats (each weighing 150–200 g.) of the Sprague-Dawley strain, fasted for approximately 18–24 hours prior to administration. The rats were first lightly anesthetized with pentobarbital (at 15 mg./kg., i.v.), a blood sample was taken from the tail vein and the test compound was administered intraperitoneally at dose levels of 32, 18 and 10 mg./kg., respectively. Additional blood samples were then taken at 1, 2 and 4 hour intervals after administration of the drug. Blood glucose was determined by adapting the method of W. S. Hoffman [Journal of Biological Chemistry, Vol. 120, p. 51 (1937)] to the Autoanalyzer instrument produced by Technicon Instruments Corporation of Chauncey, N.Y. On this basis, the maximum percent decrease in blood sugar was calculated and reported as such (i.e., as hypoglycemic activity) for the various compounds listed in the table below:

| Tricyclicazoindole Cod. | Hypoglycemic Activity (Max.% Fall) | | |
|---|---|---|---|
| | 10 mg./kg. | 18mg./kg. | 32mg./kg. |
| Product of Example I | 30 | 28 | — |
| Product of Example III | 18 | 12 | — |
| Product of Example IV | 15 | 17 | 25 |
| Product of Example VI | 19 | 18 | 25 |
| Product of Example VII | 19 | 15 | 28 |

What is claimed is:

1. A compound selected from the group consisting of tricyclicazaindole bases of the formula:

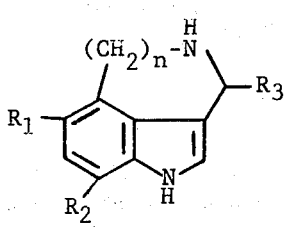

and the pharmaceutically acceptable acid addition salts thereof, wherein $R_1$ and $R_2$ are each a member selected from the group consisting of hydrogen and methoxy; $n$ is 2 and $R_3$ is a member selected from the group consisting of alkyl having from 1 to 6 carbon atoms, cycloalkyl having from 3 to 6 carbon atoms, phenylalkyl having up to 3 carbon atoms in the alkyl moiety, phenyl, chlorophenyl, tolyl, anisyl and thienyl.

2. A compound as claimed in claim 1 wherein $R_1$ and $R_2$ are each hydrogen and $R_3$ is alkyl having from 1 to 6 carbon atoms.

3. A compound as claimed in claim 1 wherein $R_1$ and $R_2$ are each methoxy and $R_3$ is alkyl having from 1 to 6 carbon atoms.

4. 3,4,5,6-Tetrahydro-3-isopropyl-1H-azepino[3,4,5-c,d]indole.

* * * * *